United States Patent [19]

Freeman

[11] Patent Number: 5,797,359
[45] Date of Patent: Aug. 25, 1998

[54] STEPPED PISTON TWO-CYCLE INTERNAL COMBUSTION ENGINE

[76] Inventor: Quilla H. Freeman, 1048 Gardner St., Los Angeles, Calif. 90046

[21] Appl. No.: 874,945

[22] Filed: Jun. 13, 1997

[51] Int. Cl.$^6$ ............................................. F01M 3/04
[52] U.S. Cl. ............................ 123/58.5; 123/73 F
[58] Field of Search ........................... 123/58.5, 58.6, 123/65.5, 73 F, 41.35, 41.38, 193.6

[56] References Cited

U.S. PATENT DOCUMENTS

| | | | |
|---|---|---|---|
| 1,025,439 | 5/1912 | Whidbourne et al. | 123/58.5 |
| 1,503,370 | 7/1924 | Martin | 123/58.5 |
| 1,505,211 | 8/1924 | Lorbach | 123/58.5 |
| 1,513,190 | 10/1924 | Smith et al. | 123/58.5 |
| 1,601,344 | 9/1926 | Burtnett | 123/58.5 |
| 1,626,387 | 4/1927 | Burtnett | 123/58.5 |
| 1,900,475 | 3/1933 | Winquist | 123/58.5 |
| 4,522,163 | 6/1985 | Hooper | 123/193.6 |
| 4,895,111 | 1/1990 | Elsbett | 123/41.35 |
| 5,174,249 | 12/1992 | Katou | 123/41.38 |

*Primary Examiner*—Marguerite McMahon
*Attorney, Agent, or Firm*—Allen A. Dicke, Jr.

[57] ABSTRACT

The engine has at least first and second stepped cylinders with the pistons therein operated from the same crankshaft at different portions of the engine cycle. The pistons in the cylinders to define a combustion space and first and second air compression spaces. The combustion space can expand a combusted fuel/air mixture and a double-acting air cylinder of the first cylinder is connected to deliver charging air to its own combustion space and deliver purging air to the combustion space of the other cylinder. Pressure lubrication for the cylinder walls is provided by oil sprays through openings in the piston skirts, with drainage back to the crankcase.

20 Claims, 3 Drawing Sheets

STEPPED PISTON TWO-CYCLE INTERNAL COMBUSTION ENGINE

FIELD OF THE INVENTION

This invention is directed to a multiple cylinder two-cycle stepped piston internal combustion engine wherein the stepped piston of one cylinder supplies the combustion air for the same cylinder and the scavenging air for the adjoining cylinder.

BACKGROUND OF THE INVENTION

In many two-cycle engines the crankcase acts as a compressor to deliver scavenging air. Such is objectionable because the crankcase air is contaminated with lubricating oil and thus lubricating oil is delivered to the cylinder for later combustion. This results in the loss of lubricating oil together with oil in the combustion chamber which causes plug fouling and dirty combustion. Such is undesirable.

It is desirable to have a source of clean scavenging air which scavenges the exhaust products of the prior combustion from the cylinder and the source of clean charging air for supplying the cylinder with air for proper combustion. This can be accomplished in the two-cylinder, two-stroke cycle carbureted or fuel injected internal combustion engine with stepped pistons. The piston in the combustion chamber is single acting whereas the stepped piston delivering air is double acting. When there are two cylinders, they are 180 degrees apart. When there is more than two cylinders, the cylinders are always a multiple of two.

The two-stroke cycle engine with combustion engine has been in use since the 19$^{th}$ century. The two-stroke cycle is a convenient structure to improve the horsepower to weight ratio. However, the present need for lower emission of atmospheric pollutants renders the design less satisfactory. Two-stroke cycle engines have used air compressors to produce enough compression for supplying the combustion air for the power stroke and supply scavenging air for the evacuation of exhaust gas. The exhaust gas-driven turbo compressors have not been available for small two-stroke cycle engines because of the very small size of the required turbo compressor.

In order to aid in the understanding of this invention it can be said in essentially summary form that it is directed to a stepped piston two-cycle internal combustion engine which has a small piston operating in a combustion cylinder and has a large double-acting piston acting to deliver air both to its own combustion cylinder and its companion combustion cylinder so that the double-acting larger stepped piston delivers the necessary air for proper scavenging and air charging.

It is thus a purpose and advantage of this invention to provide a two-cycle internal combustion engine which is designed to be of low-cost and light weight and with a minimum of moving parts so that an efficient, economic engine can be readily produced.

It is a further purpose and advantage of this invention to provide a two-cylinder stepped piston two-cycle internal combustion engine in which the pistons in the two cylinders are operating on the same crankshaft but in different portions of their cycle and air is delivered from one cylinder to the other to provide proper scavenging and charging.

It is a further purpose and advantage of this invention to provide a two-cycle internal combustion engine which is efficient and produces a minimum of undesirable exhaust gases by achieving proper combustion.

Further purposes and advantages of this invention will become apparent from the study of the following portions of this specification, the claims and the attached drawings.

DESCRIPTION OF THE PREFERRED EMBODIMENTS

Figure 1:
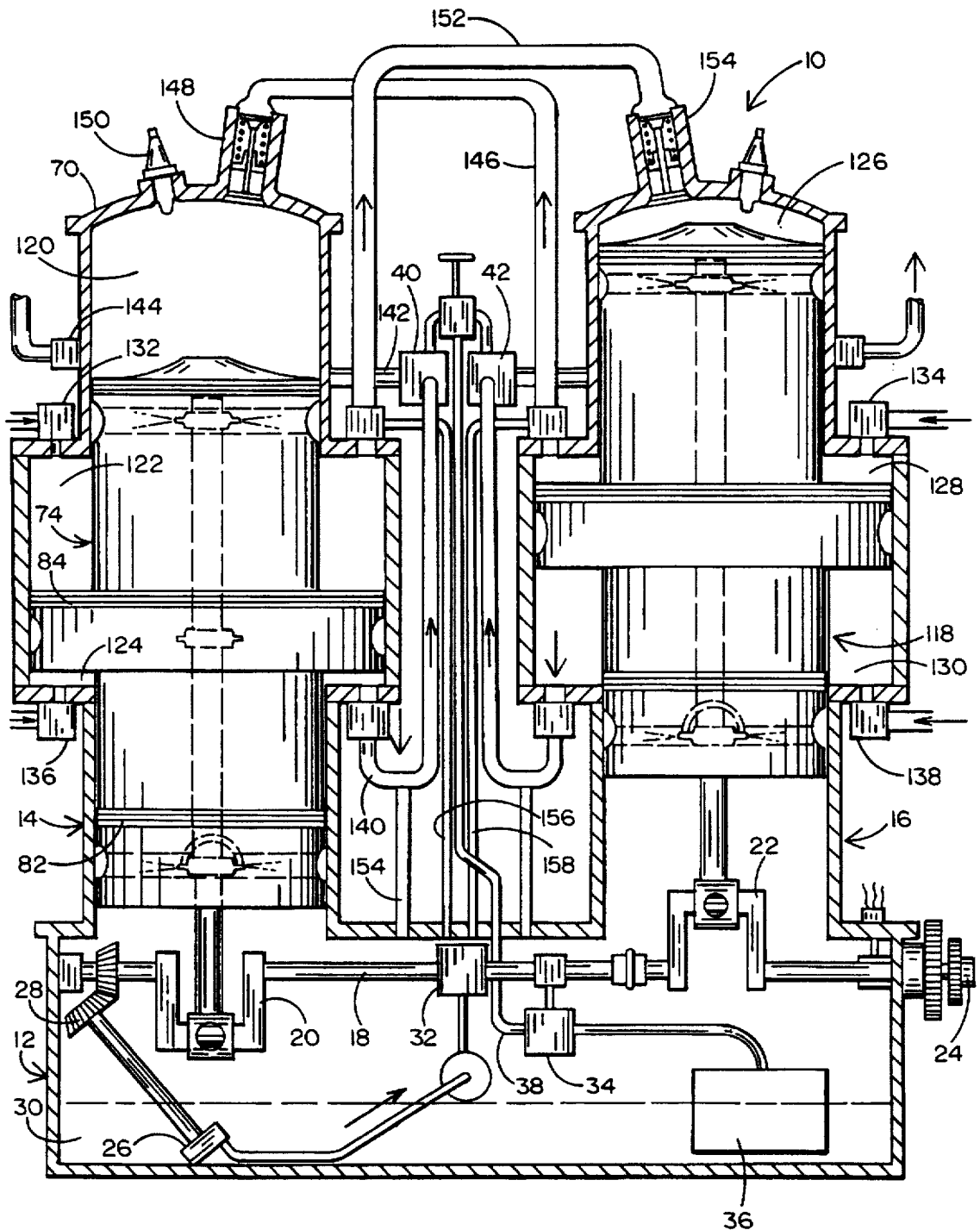
FIG. 1 is a side elevational view of a two-cylinder stepped piston two-cycle internal combustion engine in accordance with this invention, with a crankcase and cylinders taken in substantially centerline section.

The presently preferred embodiment of the stepped piston two-cycle internal combustion engine of this invention is generally indicated at 10 in FIG. 1. The engine 10 has a crankcase 12 to which are secured first and second cylinder assemblies 14 and 16. The crankcase contains a crankshaft 18 which is mounted on suitable bearings for rotational support therein. The crankshaft has cranks 20 and 22 thereon. Rotation of the crankshaft permits delivery of power from the engine to an external power-consuming device at power take-off 24. The power take-off may be connected to an electrical generator, a fluid pump or connected to drive a machine or a vehicle. Rotation of the crankshaft also drives lubricating oil pump 26 through gears 28. Lubricating oil 30 in the sump of the crankcase is delivered to the inner drilling in the crankshaft through bearing 32. Further details of the lubricating system are described below. The crankshaft also drives fuel pump 34 by means of a cam on the crankshaft or by means of gears on the crankshaft. The fuel pump 34 draws gasoline from gasoline tank 36. The gasoline under pressure is delivered through gasoline line 38 to carburetors 40 and 42. Fuel injection may alternatively provide the correct fuel/air mixture. The gasoline tank may be mounted at any convenient location and the gasoline pump can be actuated from any convenient power source, including an electrically powered fuel pump.

Figure 2:
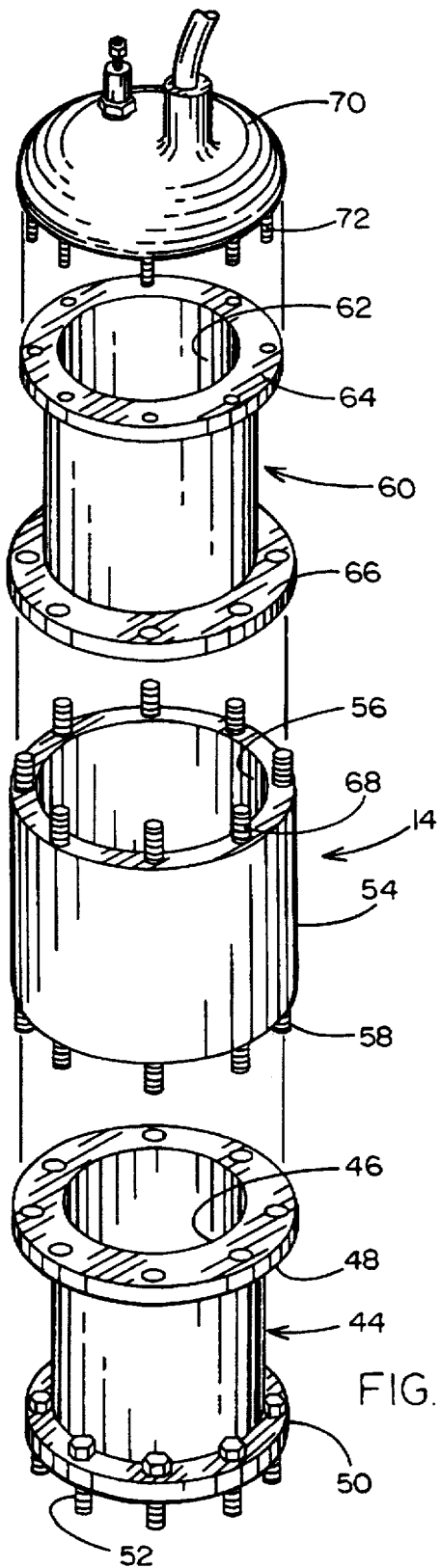
FIG. 2 is an exploded view of one of its cylinder assemblies.

The engine 10 is a stepped piston engine and accordingly has stepped cylinders. The cylinder assembly 14 is shown in exploded detail in FIG. 2. The cylinder assembly 16 is of similar construction. Referring to FIG. 2, lower cylinder 44 has a cylindrical bore 46 therein and has top and bottom flanges 48 and 50. The bottom flange 50 attaches to the crankcase by means of bolts 52. The center cylinder 54 is of larger diameter and has a bore 56. The top flange 48 is large enough to reach to the outer diameter of center cylinder 54. The center cylinder 54 is attached to lower cylinder 44 by means of studs 58 which engage through stud holes in the flange 48. There are nuts beneath the flange holding down the center cylinder. The top cylinder 60 is structurally identical to the bottom cylinder 44, except that it is turned upside down. It has a bore 62 together with a top flange 64 and a bottom flange 66. The bottom flange 66 is attached to the top of center cylinder 54 with studs 68. Cylinder head 70 has studs 72 which extend downward through flange 64 for securement thereunder by means of nuts. The cylinder assembly 16 is built up in the same way.

Figures 5, 6:
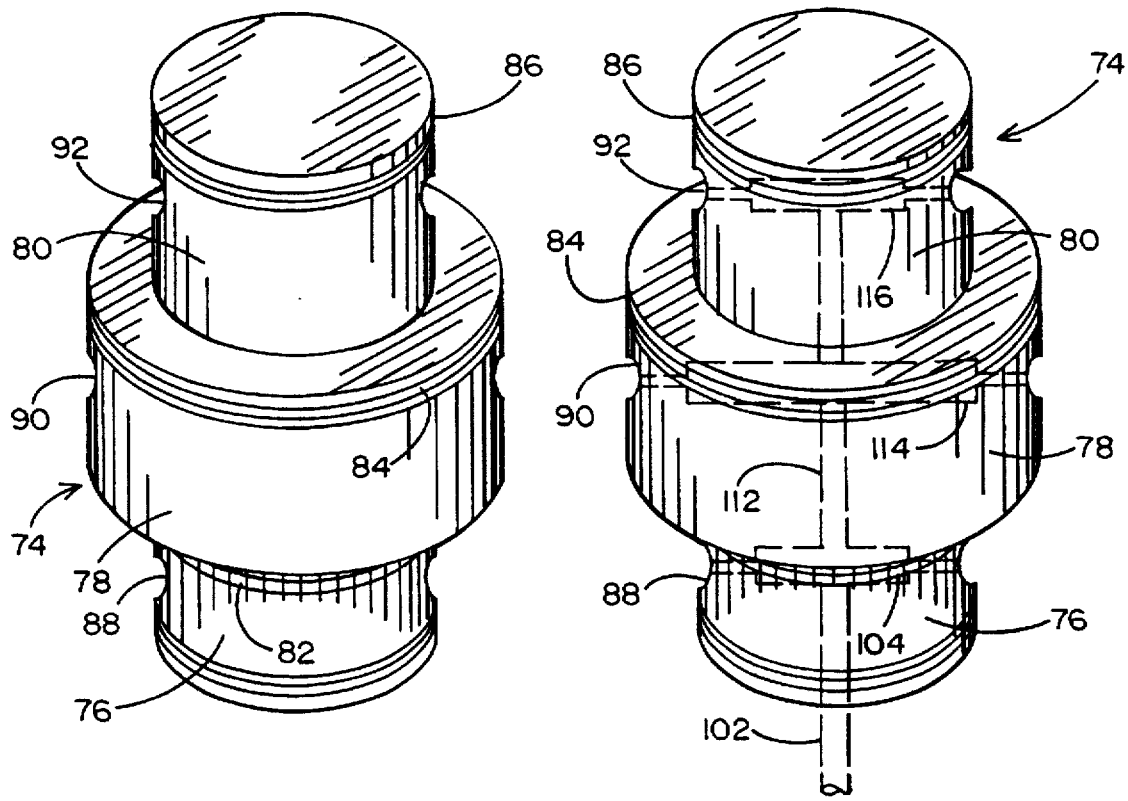
FIG. 5 is an isometric view of the assembled piston.
FIG. 6 is similar thereto, showing the connecting rods and wrist pins in dashed lines.

The piston assembly 74 is a stepped piston. It may be made of one or more parts and when assembled into the cylinder they work together. Piston assembly 74 has lower piston 76, center piston 78 and upper piston 80. These are sized respectively to slide in lower cylinder bore 46, center cylinder bore 56 and upper cylinder bore 62. Since the bores 46 and 62 are the same, the outside diameter of the lower and upper pistons 76 and 80 are the same. Piston rings are carried on each of the pistons to make a substantially air-tight fit and to control the lubricating oil. Piston rings 82, 84 and 86 are respectively positioned on the lower, center and upper pistons. These piston rings engage in their respective cylinder bores to keep the lubricating oil below the piston rings. There are side openings in each of the pistons below the rings. The left-hand side openings in the piston 74, seen in FIG. 5, are indicated at 88, 90 and 92. There is preferably also an opening on the opposite side of each piston as seen in FIGS. 5 and 6.

Figure 3:
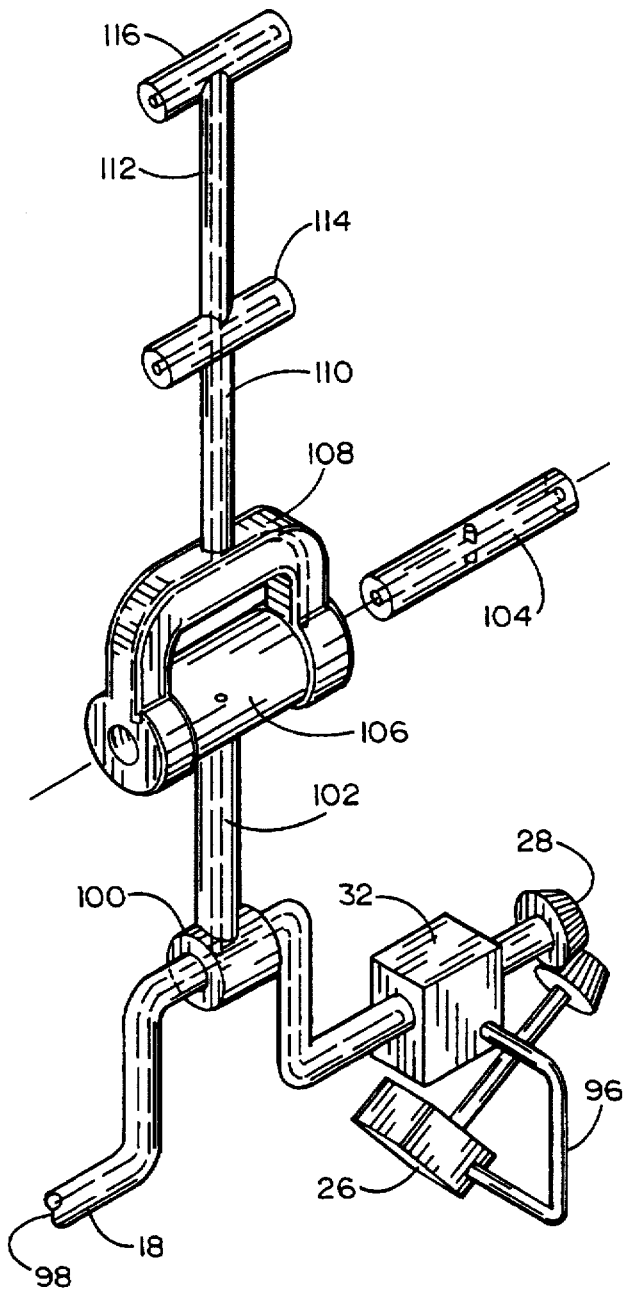
FIG. 3 is an isometric view of one of the cranks, with the wrist pin in the exploded position, showing lubrication paths.
Figure 4:
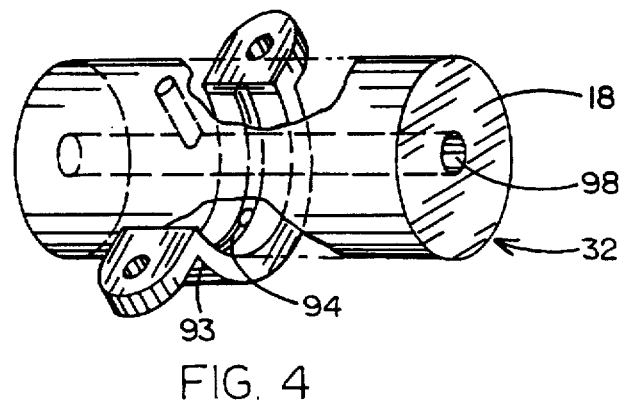
FIG. 4 is a perspective view showing one of the crankshaft journals with the crankshaft therein, with a portion of the crankshaft broken away.

FIG. 3 shows the crankshaft 18 passing through the bearing 32. As seen in FIG. 4, the bearing cap 93 has a groove 94 therein which is fed from lubricating oil pump 36 through oil tube 96, see FIG. 3. Crankshaft 18 has an inner drill lubricating oil hole 98 therethrough which is thus supplied with lubricating oil under pressure.

Crank bearing 100 has a groove therein which is fed lubricating oil through a radial hole in the crank, similar to the structure of FIG. 4. Connecting rod 102 extends upwards from the crank bearing 100. Wrist pin 104 engages in a wrist pin hole in the piston 76. The wrist pin engages through the wrist bearing 106 and through wrist pin yoke 108. Each has grooves, radial holes and inner drillings so that a continuous pressurized oil supply is delivered upwards through inner drillings 110 in rod 112. The rod 112 is mounted on the yoke 108. Cross pins 114 and 116 are mounted on rod 112. Each of the cross pins and the wrist pin 104 has one oil passage therethrough so that an oil spray is delivered out of each end. As seen in FIG. 6, these pins and their axial oil sprays are aligned with the openings in the skirts of each of the pistons. FIG. 6 shows the oil delivering structure in heavy dashed lines to show its orientation with respect to the piston assembly. It should also be noted that in each case the rings are above the lubricating openings in the sides of the piston skirts. In this way, the cylinder walls are lubricated. Return of the lubricant to the crankcase will be discussed below.

Both of the cylinders 14 and 16 are identical in construction, but the cranks 20 and 22 are 180 degrees away from each other so that when the piston assembly 74 is at the bottom dead center in cylinder assembly 14, the piston assembly 118 in cylinder assembly 16 is at top dead center, as shown in FIG. 1.

There are three effective compression and expansion volumes in each of the two cylinders. The spaces below the two lower pistons are connected together through the crankcase and thus have no compression or expansion function. The cylinder assembly 14 has combustion space 120, upper air compression space 122 and lower air compression space 124. The cylinder assembly 16 has corresponding combustion space 126, upper air compression space 128 and lower air compression space 130. The upper air compression spaces 122 and 128 can respectively draw air in from the atmosphere through reed valves 132 and 134. The lower air compression spaces can draw in air from the atmosphere through reed valves 136 and 138. The air can be conditioned by being drawn through an air filter, not shown. As the piston 74 moves down, air is delivered from the space 124 through a reed valve to air tube 140 which delivers air to carburetor 40. The air through carburetor 40 is delivered to the cylinder through mixture tube 142 which enters the lower part of the combustion space 120 through a cylinder side opening. The cylinder side opening is uncovered when the piston assembly 74 moves to its bottom dead center position. Exhaust port 144 is also uncovered toward the bottom dead center position of piston assembly 74. The gasoline-air charge is thus delivered into the combustion space and exhaust gases scavenged out. However, it must also be recognized that as the piston assembly 74 is moving downwards toward bottom dead center position, the piston assembly 118 is moving upward toward top dead center position. Air is delivered out of the space through an oil separator to air tube 146. The oil separator delivers oil to the crankcase and air to poppet valve 148 in cylinder head 70. Thus, when the pressure goes down in the combustion space 120 as the exhaust port 144 is uncovered, additional scavenging air is supplied through air tube 146. Air is available for scavenging as soon as the air pressure in air tube 146 is sufficiently above the combustion space pressure to open poppet value 148.

The combustion space 120 is scavenged and a new air/fuel charge is delivered thereto. With continued operation of the engine, the piston assembly 74 rises to compress the air/fuel mixture. Appropriately near top dead center, spark plug 150 is energized to cause combustion in combustion space 120 and drive the piston assembly 74 downward. This same function operates with respect to the cylinder assembly 16 with its piston assembly 118, except that the air space 122 is delivered through air tube 152 to pump at valve 154. Thus, the one cylinder interacts with the other to provide scavenging air. Both cylinders operate on the same cycle but 180 degrees apart from each other. Since the engine is a two-cycle engine, when one combustion space in the combustion mode, the other is in the compression mode.

The air tubes from the lower compression spaces up to the carburetors may contain oil. For this reason, the air tubes have capillary oil drains at the bottom. The capillary oil drain 154 drains the bottom of the air tube 140. The other cylinder has the same structure. In addition, the air tubes 146 and 152 might deliver oil, if it is not otherwise drained away. Therefore, capillary oil drains 156 and 158 return oil from the reed valves at the outlet of upper compression spaces 122 and 128 back to the crankcase. In this way, a two-cycle engine with adequate scavenging and charging air is provided. It is understood that in accordance with this invention, two cylinders must cooperate together so that one delivers proper charging and scavenging air at the correct position and cycle of another cylinder, and vice versa. Therefore, engines incorporating the concept of this air flow must be multiple cylinder engines with an even number of cylinders. Furthermore, the cylinders may be oriented in various related ways, such as in pancake, opposed configuration, V-shaped configuration or straight configuration.

This invention has been described in its presently preferred best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A stepped piston internal combustion engine comprising:

a crankshaft rotatably mounted in said engine, said crankshaft having first and second cranks, said first and second cranks being angularly related with respect to each other;

first and second cylinder assemblies on said engine, said first and second cylinder assemblies each being stepped cylinder assemblies defining first and second combustion spaces and first and second compression spaces respectively in said first and second cylinder assemblies;

first and second stepped piston assemblies respectively mounted in said first and second cylinder assemblies, said first and second piston assemblies each having a piston for reciprocating in said combustion space and a piston for reciprocating in said compression space, each said piston assembly comprising a lower piston, a center piston and an upper piston, said upper and lower pistons being of the same diameter, each of said pistons having a skirt and having a lubrication opening through each of said skirts, each of said pistons having piston rings thereon on the side of said lubrication opening toward said upper piston;

first and second poppet valves respectively mounted on said first and second cylinder assemblies for permitting passage into said combustion spaces;

an air tube connecting said first compression space to said second combustion space and an air tube connecting said second compression space to said first combustion space so that said first compression space delivers air to said second combustion space and said second compression space delivers air to said first combustion space; and first and second connecting rods connected to be actuated by said crankshaft and respectively connected to reciprocate said first and second piston assemblies in said first and second cylinder assemblies.

2. The stepped piston internal combustion engine of claim 1 wherein each said piston assembly and each said cylinder assembly are configured so that said air compressing piston separates said cylinders into upper and lower air compression spaces so that said piston assembly acts as a double-acting air compressor, said upper space being closer to said combustion space and said upper space of said first cylinder assembly being connected through said air tube to said poppet valve in said second cylinder and said first and second lower air compression spaces in said first and second cylinders being respectively connected to said first and second combustion spaces to provide charging air to said combustion spaces.

3. The stepped piston internal combustion engine of claim 2 wherein said first and second air tubes from said first and second lower air compression spaces respectively having first and second fuel/air proportioning means connected thereto and said first and second fuel/air proportioning means respectively being connected to said first and second combustion spaces so that charging air to the combustion space of said first cylinder is produced during the expansion of said combustion space and scavenging air is produced by the compression stroke of said second piston.

4. The stepped piston internal combustion engine of claim 1 wherein an oil passage is provided in each said piston, said oil passage having means for delivering lubricating oil out of each said skirt opening to lubricate the adjacent cylinder wall; and means for providing pressurized lubricant in said oil passage.

5. The stepped piston internal combustion engine of claim 4 wherein said means for providing pressurized lubricant includes an oil pump and a connecting rod between said crank in said piston assembly, said connecting rod having an oil passage therethrough and said pump being connected to supply lubricant under pressure to said oil passage.

6. The stepped piston internal combustion engine of claim 5 wherein each said piston assembly and each said cylinder assembly are configured so that said air compressing piston separates said cylinders into upper and lower air compression spaces so that said piston assembly acts as a double-acting air compressor, said upper space being closer to said combustion space and said upper space of said first cylinder assembly being connected through said air tube to said poppet valve in said second cylinder and said first and second lower air compression spaces in said first and second cylinders being respectively connected to said first and second combustion spaces to provide charging air to said combustion spaces.

7. The stepped piston internal combustion engine of claim 6 wherein said first and second air tubes from said first and second lower air compression spaces respectively having first and second fuel/air proportioning means connected thereto and said first and second fuel/air proportioning means respectively being connected to said first and second combustion spaces so that charging air to said combustion space of said first cylinder is produced during the expansion of said combustion space and scavenging air is produced by the compression stroke of said second piston.

8. A stepped piston internal combustion engine comprising:

a crankshaft, at least first and second cranks on said crankshaft, said cranks being at different phase angles;

first and second cylinder assemblies, each of said first and second cylinder assemblies comprising a single acting combustion chamber and a double-acting air compression chamber, each said cylinder assembly comprising a lower cylinder, a center cylinder and a top cylinder, said cylinders being flanged and bolted together, said center cylinder being of larger diameter than said bottom and said top cylinders and including a cylinder head fastened to said top cylinder to define said combustion chamber in said top cylinder;

first and second piston assemblies respectively reciprocally mounted within said first and second cylinder assemblies, said first and second piston assemblies being respectively connected to said first and second cranks so that rotation of said crankshaft reciprocates said piston assemblies in said cylinder assemblies, said first and second piston assemblies each comprising a combustion piston for reciprocating in said combustion cylinder to increase and decrease the volume of said combustion chamber, said piston assembly having an air piston for reciprocating in said double-acting air cylinder for dividing said compression cylinder into an A compression space and a B compression space;

duct work connecting said B compression space of said first compression cylinder to said first combustion space and duct work connecting said A compression space of said first compression cylinder to said second combustion space; and duct work connecting said B compression space of said second compression cylinder to said second combustion space and duct work connecting said A compression space of said second compression cylinder to said first combustion space so that reciprocation of one of said pistons delivers air to both of said combustion spaces.

9. The stepped piston internal combustion engine of claim 8 wherein said duct work connecting said B compression space of said first compression cylinder to said first combustion chamber includes means for delivery of fuel to said first combustion space and said duct delivering air from said B compression space of said second compression cylinder to said second combustion space has means for delivering fuel to said second combustion space.

10. The stepped piston internal combustion engine of claim 9 wherein said means for delivering fuel comprises a carburetor.

11. The stepped piston internal combustion engine of claim 8 further including lubrication means for lubricating both said first and second cylinder assemblies.

12. The stepped piston internal combustion engine of claim 8 wherein there is a crankcase and said crankshaft is rotatably mounted in said crankcase, said cylinder assemblies being mounted on said crankcase.

13. The stepped piston internal combustion engine of claim 11 wherein said piston assembly has openings therein and said means for lubricating includes oil sprays within said piston assemblies for spraying oil onto said cylinder assemblies.

14. The stepped piston internal combustion engine of claim 13 wherein there is a crankcase and said crankshaft is rotatably mounted in said crankcase, said cylinder assemblies being mounted on said crankcase.

15. The stepped piston internal combustion engine of claim 14 wherein there is an oil sump in said crankcase and an oil pump for delivering lubricating oil, a connecting rod mounted on said crank and connected to said piston assembly, said crankshaft and said connecting rod having oil passages therein so that oil under pressure can be delivered from said oil sump into said piston assemblies.

16. The stepped piston internal combustion engine of claim 8 wherein said piston assembly comprises a lower piston, a center piston and an upper piston respectively sized to reciprocate within said lower, said center and said upper cylinders so that said center piston divides said center cylinder into A and B compression chambers.

17. The stepped piston internal combustion engine of claim 16 wherein each of said pistons has a skirt and each of said skirts has an opening therein and lubrication means is positioned within each of said pistons for delivering oil out of said skirt openings to said cylinders for lubrication thereof.

18. A stepped piston internal combustion engine comprising:

a crankshaft, at least first and second cranks on said crankshaft, said cranks being at different phase angles;

first and second cylinder assemblies, each of said first and second cylinder assemblies comprising first, second and third cylinders, said second cylinder being larger in diameter than said first and third cylinders, each of said cylinders being open ended before assembly so that each can be machined through, said second and third cylinders being without cylinder wall ports, each of said first and third cylinders being flanged for assembly, and means for lubricating the walls of said first, second and third cylinders;

a head on each of said first cylinders to define first and second combustion cylinders;

first and second piston assemblies respectively reciprocally mounted within said first and second cylinder assemblies, said first and second piston assemblies being respectively connected to said first and second cranks so that rotation of said crankshaft reciprocates said piston assemblies in said cylinder assemblies, said first and second piston assemblies each comprising a combustion piston for reciprocating in said combustion cylinder to define a combustion chamber and to increase and decrease the volume of said combustion chamber, said piston assembly having an air piston for reciprocating within said second cylinder for defining A and B compression spaces in said second cylinder and for increasing and decreasing the volume of said A combustion space and said B compression space within said second cylinder;

first and second poppet valves respectively on said first and second cylinder assemblies;

duct work connecting said A compression space of said first cylinder assembly to said second poppet valve of and connecting said A compression space of said second cylinder to said first poppet valve, duct work connecting said B compression space of said first cylinder assembly to said combustion space of said first cylinder assembly and connecting said B compression space of said second cylinder assembly to said combustion space of said second cylinder assembly so that said compression spaces serve to supply combustion air and serve to supply scavenging air to said combustion chambers.

19. The stepped piston internal combustion engine of claim 18 wherein a lubricating oil passage is provided in each piston, said lubricating oil passage having an outlet thereon for delivering lubricating oil to lubricate the adjacent cylinder wall; and means for providing pressurized lubricating oil in said oil passage.

20. The stepped piston internal combustion engine of claim 18 wherein said cylinder assemblies are formed of first, second and third open-ended cylinder tubes and flanges thereon to bolt said cylinder tubes together for engine assembly so that said cylinders can be machined straight through for ease of manufacture.

* * * * *